(12) United States Patent
Goudard et al.

(10) Patent No.: US 11,111,881 B2
(45) Date of Patent: Sep. 7, 2021

(54) AIRCRAFT ENGINE ASSEMBLY WITH ISOLATION VALVE OUTSIDE UNCONTAINED ROTOR IMPACT AREA

(71) Applicant: C SERIES AIRCRAFT LIMITED PARTNERSHIP, Mirabel (CA)

(72) Inventors: Olivier Goudard, Laval (CA); Angelo Coluni, Ville Mont-Royal (CA)

(73) Assignee: AIRBUS CANADA LIMITED PARTNERSHIP, Mirabel (CA)

( * ) Notice: Subject to any disclaimer, the term of this patent is extended or adjusted under 35 U.S.C. 154(b) by 298 days.

(21) Appl. No.: 16/305,925

(22) PCT Filed: May 24, 2017

(86) PCT No.: PCT/IB2017/053072
§ 371 (c)(1),
(2) Date: Nov. 30, 2018

(87) PCT Pub. No.: WO2017/208117
PCT Pub. Date: Dec. 7, 2017

(65) Prior Publication Data
US 2020/0332742 A1    Oct. 22, 2020

Related U.S. Application Data

(60) Provisional application No. 62/343,094, filed on May 30, 2016.

(51) Int. Cl.
*F02K 1/72*     (2006.01)
*F02K 1/76*     (2006.01)
(Continued)

(52) U.S. Cl.
CPC ............... *F02K 1/72* (2013.01); *F02K 1/763* (2013.01); *B64D 27/12* (2013.01); *B64D 29/06* (2013.01);
(Continued)

(58) Field of Classification Search
CPC ... F02K 1/06; F02K 1/08; F02K 1/085; F02K 1/09; F02K 1/10; F02K 1/11; F02K 1/64;
(Continued)

(56) References Cited

U.S. PATENT DOCUMENTS 2,737,015 A * 3/1956 Wright ............... F02K 1/18
60/224
4,391,409 A * 7/1983 Scholz ............... F02K 1/72
239/265.29

(Continued)

OTHER PUBLICATIONS

Federal Aviation Administration, Advisory Circular, Mar. 25, 1997, AC No. 20-128A, https:www.faa.gov/documentlibrary/media/Advisory_Circular/AC_20-128A.pdf, accessed on Aug. 7, 2017.
(Continued)

*Primary Examiner* — Alain Chau
(74) *Attorney, Agent, or Firm* — Norton Rose Fulbright Canada LLP (57) ABSTRACT

An aircraft has a fuselage, left and right wings, and left and right engine assemblies connected to the wings. Each engine assembly has a nacelle, an engine housed in the nacelle, the engine having a plurality of rotors defining an uncontained rotor impact area, a pylon connecting the nacelle to its wing, at least one hydraulic actuator connected to at least one of the engine and the nacelle, at least one directional control valve hydraulically connected to the at least one hydraulic actuator, and at least one isolation valve hydraulically connected to the at least one directional control valve for selectively cutting off a supply of hydraulic fluid to the at least one directional control valve, the at least one isolation valve being disposed rearward of the uncontained rotor impact area and forward of a trailing edge of its corresponding wing.

23 Claims, 10 Drawing Sheets

(51) Int. Cl.
*B64D 29/06* (2006.01)
*B64D 27/12* (2006.01)

(52) U.S. Cl.
CPC ........ *F02K 1/766* (2013.01); *F05D 2220/323* (2013.01); *F05D 2240/129* (2013.01); *F05D 2270/64* (2013.01)

(58) Field of Classification Search
CPC ..... F02K 1/68; F02K 1/70; F02K 1/72; F02K 1/76; F02K 1/763; F02K 1/766; B64D 29/02; B64D 29/06; B64D 27/12; B64D 2033/022; F05D 2270/64
See application file for complete search history.

(56) References Cited

U.S. PATENT DOCUMENTS

| | | | | |
|---|---|---|---|---|
| 5,609,020 | A * | 3/1997 | Jackson | F02K 1/76 244/110 B |
| 5,944,285 | A * | 8/1999 | Royer | B64C 1/1453 244/129.4 |
| 6,625,972 | B1 | 9/2003 | Sternberger | |
| 7,927,686 | B2 * | 4/2011 | Zielinski | B64D 29/02 428/166 |
| 7,988,092 | B2 * | 8/2011 | Bonnaud | B64C 23/06 244/121 |
| 8,118,252 | B2 * | 2/2012 | Dumont | B64D 29/02 244/54 |
| 8,713,911 | B2 * | 5/2014 | Kopecek | F02K 1/72 60/226.2 |
| 8,814,080 | B2 * | 8/2014 | Dumont | B64D 29/02 244/54 |
| 9,322,360 | B2 * | 4/2016 | James | F02K 1/62 |
| 9,650,993 | B2 * | 5/2017 | Chakkera | F02K 1/76 |
| 10,011,365 | B2 * | 7/2018 | Shephard | B64D 29/02 |
| 2004/0139726 | A1 | 7/2004 | Colotte et al. | |
| 2008/0067292 | A1 * | 3/2008 | Bonnaud | B64D 29/02 244/199.1 |
| 2009/0155070 | A1 * | 6/2009 | Duchatelle | F01D 25/162 415/213.1 |
| 2012/0151897 | A1 | 6/2012 | Kopecek et al. | |
| 2013/0145743 | A1 * | 6/2013 | Vaughan | F02K 1/566 60/226.2 |
| 2015/0108249 | A1 * | 4/2015 | James | F02K 1/62 239/265.19 |
| 2015/0260125 | A1 * | 9/2015 | Peyron | F02K 1/76 239/265.25 |
| 2015/0300294 | A1 * | 10/2015 | Chakkera | F02K 1/72 60/226.2 |
| 2016/0001888 | A1 * | 1/2016 | Shephard | B64D 33/04 244/130 |
| 2017/0096238 | A1 * | 4/2017 | Porte | F01D 25/24 |

OTHER PUBLICATIONS

European Aviation Safety Agency, General acceptable means of compliance for airworthiness of products, parts, and appliances, Nov. 5, 2003, www.easa.europa.eu/system/files/dfu/decision_ED_2003_12_RM.pdf, accessed on Aug. 7, 2017.
PCT International Search Report and Written Opinion dated Aug. 16, 2017 re: International Patent Application No. PCT/IB2017/053072.

* cited by examiner

AIRCRAFT ENGINE ASSEMBLY WITH ISOLATION VALVE OUTSIDE UNCONTAINED ROTOR IMPACT AREA

CROSS-REFERENCE

The present application is a national phase application under 35 U.S.C. 371 of International Patent Application No. PCT/IB2017/053072 filed on May 24, 2017, which claims priority from U.S. Provisional Patent Application No. 62/343,094, filed May 30, 2016, the entirety of which is incorporated herein by reference.

FIELD OF TECHNOLOGY

The present technology relates generally to aircraft engine assemblies, and more particularly to hydraulic systems of aircraft engine assemblies.

BACKGROUND

In order to decelerate once they have touched-down during a landing manoeuvre, most aircraft are provided with thrust reverser systems. The thrust reverser system, when deployed, redirects most of the thrust generated by an engine of the aircraft toward a front of the aircraft. Many thrust reverser systems are actuated by hydraulic actuators.

In order to prevent the thrust reverser from deploying while in flight, aircraft manufacturers have designed many fail-safes such as, but not limited to, thrust reverser system locks. These locks prevent the thrust reverser system from deploying unless certain conditions are met. One of these conditions being that there is weight applied on the wheels of the aircraft, thereby indication that the aircraft is on the ground.

Aircraft engines such as turbofan engines have many rotating parts. In a typical turbofan engine, these include, but are not limited to, a fan, compressor rotors, and turbine rotors, collectively referred to as rotors. Although unlikely, there is a possibility that one or more rotors could fail such that one or more rotor fragments could break off and escape from the engine. This type of failure is referred to as an uncontained rotor failure. The area of the aircraft where such a projected rotor fragment could impact, and possibly cause damage, is called an uncontained rotor impact area.

Hydraulic fluid used in the hydraulic system used to actuate the above-described thrust reverser system is flammable. As the thrust reverser system is provided on the engine, should an uncontained rotor failure damage a line of this hydraulic system containing hydraulic fluid, the spilled hydraulic fluid could contact an ignition source and catch fire.

To limit the damage caused by such an event, one or more isolation valves are provided which normally cut-off the supply of hydraulic fluid to the hydraulic system used to actuate the thrust reverser system. As a result, should a hydraulic line of this system become damaged, only the limited amount of hydraulic fluid that is downstream of the isolation valve may drain out of the system. The greater amount of hydraulic fluid upstream of the isolation valve is thus prevented from flowing out of the system onto an ignition source.

To be effective, the isolation valves need to avoid damage resulting from uncontained rotor failure. One solution consists in shielding the isolation valve from rotor fragments that could be projected in an uncontained rotor failure. This can be done by adding a part acting as a shield or by placing the isolation valve behind another less critical component that will act as the shield. The former adds weight, cost and assembly complexity. The latter may not always be convenient due to the number of components that have to be fitted within a relatively small volume around the engine.

The same considerations have to be taken into account for other hydraulic systems provided on aircraft engines.

There is therefore a desire for a hydraulic system for an aircraft engine that, in the event of an uncontained rotor failure, protects an isolation valve from damage.

SUMMARY

It is an object of the present technology to ameliorate at least some of the inconveniences present in the prior art.

According to one aspect of the present technology, there is provided an aircraft having a fuselage, a left wing connected to the fuselage and extending on a left side of the fuselage, a right wing connected to the fuselage and extending on a right side of the fuselage, a left engine assembly connected to the left wing, and a right engine assembly connected to the right wing. Each of the left and right engine assemblies has a nacelle, an engine housed in the nacelle, the engine having a plurality of rotors, the plurality of rotors defining an uncontained rotor impact area, a pylon connecting the nacelle to a corresponding one of the left wing and the right wing, at least one hydraulic actuator connected to at least one of the engine and the nacelle, at least one directional control valve hydraulically connected to the at least one hydraulic actuator for controlling a direction of motion of the at least one hydraulic actuator, and at least one isolation valve hydraulically connected to the at least one directional control valve. The at least one isolation valve selectively cuts off a supply of hydraulic fluid to the at least one directional control valve. The at least one isolation valve is disposed rearward of the uncontained rotor impact area and forward of a trailing edge of the corresponding one of the left wing and the right wing.

According to some implementations of the present technology, for each of the left and right engine assemblies the at least one directional control valve is disposed inside the pylon.

According to some implementations of the present technology, for each of the left and right engine assemblies the at least one isolation valve is laterally aligned with the pylon.

According to some implementations of the present technology, for each of the left and right engine assemblies the at least one isolation valve is disposed rearward of the pylon.

According to some implementations of the present technology, for each of the left and right engine assemblies the at least one isolation valve is disposed under the corresponding one of the left wing and the right wing.

According to some implementations of the present technology, each of the left and right engine assemblies also has an aft fairing connected to a rear of the pylon and to a bottom of the corresponding one of the left wing and the right wing. The at least one isolation valve is disposed inside the aft fairing.

According to some implementations of the present technology, for each of the left and right engine assemblies the at least one isolation valve is disposed rearward of the at least one directional control valve.

According to some implementations of the present technology, for each of the left and right engine assemblies the at least one isolation valve is disposed rearward of a leading edge of the corresponding one of the left wing and the right wing.

According to some implementations of the present technology, for each of the left and right engine assemblies the at least one directional control valve is disposed in the uncontained rotor impact area.

According to some implementations of the present technology, for each of the left and right engine assemblies the uncontained rotor impact area includes a large fragment uncontained rotor impact area and a small fragment uncontained rotor impact area. The large fragment uncontained rotor impact area is smaller than the small fragment uncontained rotor impact area. The at least one isolation valve of the left engine assembly is disposed rearward of the small fragment uncontained rotor impact area of the plurality of rotors of left engine assembly, and outside of the large fragment uncontained rotor impact area of the plurality of rotors of the right engine assembly. The at least one isolation valve of the right engine assembly is disposed rearward of the small fragment uncontained rotor impact area of the plurality of rotors of right engine assembly, and outside of the large fragment uncontained rotor impact area of the plurality of rotors of the left engine assembly.

According to some implementations of the present technology, each of the left and right engine assemblies also has a thrust reverser system operatively connected to the engine. For each of the left and right engine assemblies the at least one hydraulic actuator includes at least one hydraulic thrust reverser actuator for actuating the thrust reverser system.

According to some implementations of the present technology, at least one hydraulic fluid reservoir is hydraulically connected with the at least one isolation valve of the left engine assembly and the at least one isolation valve of the right engine assembly. At least one hydraulic pump is hydraulically connected to the at least one hydraulic fluid reservoir for pressurizing hydraulic fluid in the at least one hydraulic fluid reservoir for selectively applying hydraulic pressure to the at least one hydraulic actuator of the left engine assembly and the at least one hydraulic actuator of the right engine assembly.

According to another aspect of the present technology, there is provided an aircraft having a fuselage, a left wing connected to the fuselage and extending on a left side of the fuselage, a right wing connected to the fuselage and extending on a right side of the fuselage, a left engine assembly connected to the left wing, and a right engine assembly connected to the right wing. Each of the left and right engine assemblies has a nacelle, an engine housed in the nacelle, the engine having a plurality of rotors, the plurality of rotors defining an uncontained rotor impact area, a pylon connecting the nacelle to a corresponding one of the left wing and the right wing, an aft fairing connected to a rear of the pylon and to a bottom of the corresponding one of the left wing and the right wing, at least one hydraulic actuator connected to at least one of the engine and the nacelle, at least one directional control valve hydraulically connected to the at least one hydraulic actuator for controlling a direction of motion of the at least one hydraulic actuator, and at least one isolation valve hydraulically connected to the at least one directional control valve. The at least one isolation valve selectively cuts off a supply of hydraulic fluid to the at least one directional control valve. The at least one isolation valve is disposed inside the aft fairing.

According to some implementations of the present technology, for each of the left and right engine assemblies the at least one directional control valve is disposed inside the pylon.

According to some implementations of the present technology, for each of the left and right engine assemblies the at least one isolation valve is disposed rearward of the at least one directional control valve.

According to some implementations of the present technology, each of the left and right engine assemblies also has a thrust reverser system operatively connected to the engine. For each of the left and right engine assemblies the at least one hydraulic actuator includes at least one hydraulic thrust reverser actuator for actuating the thrust reverser system.

According to some implementations of the present technology, at least one hydraulic fluid reservoir is hydraulically connected with the at least one isolation valve of the left engine assembly and the at least one isolation valve of the right engine assembly. At least one hydraulic pump is hydraulically connected to the at least one hydraulic fluid reservoir for pressurizing hydraulic fluid in the at least one hydraulic fluid reservoir for selectively applying hydraulic pressure to the at least one hydraulic actuator of the left engine assembly and the at least one hydraulic actuator of the right engine assembly.

According to another aspect of the present technology, there is provided an aircraft having a fuselage, a left wing connected to the fuselage and extending on a left side of the fuselage, a right wing connected to the fuselage and extending on a right side of the fuselage, a left engine assembly connected to the left wing, and a right engine assembly connected to the right wing. Each of the left and right engine assemblies has a nacelle, an engine housed in the nacelle, the engine having a plurality of rotors, the plurality of rotors defining an uncontained rotor impact area, a pylon connecting the nacelle to a corresponding one of the left wing and the right wing, at least one hydraulic actuator connected to at least one of the engine and the nacelle, at least one directional control valve hydraulically connected to the at least one hydraulic actuator for controlling a direction of motion of the at least one hydraulic actuator, and at least one isolation valve hydraulically connected to the at least one directional control valve. The at least one isolation valve selectively cuts off a supply of hydraulic fluid to the at least one directional control valve. The at least one isolation valve is disposed rearward of a leading edge of the corresponding one of the left wing and the right wing and forward of a trailing edge of the corresponding one of the left wing and the right wing.

According to some implementations of the present technology, for each of the left and right engine assemblies the at least one directional control valve is disposed inside the pylon.

According to some implementations of the present technology, for each of the left and right engine assemblies the at least one isolation valve is laterally aligned with the pylon.

According to some implementations of the present technology, for each of the left and right engine assemblies the at least one isolation valve is disposed under the corresponding one of the left wing and the right wing.

According to some implementations of the present technology, each of the left and right engine assemblies also has a thrust reverser system operatively connected to the engine. For each of the left and right engine assemblies the at least one hydraulic actuator includes at least one hydraulic thrust reverser actuator for actuating the thrust reverser system.

According to some implementations of the present technology, at least one hydraulic fluid reservoir is hydraulically connected with the at least one isolation valve of the left engine assembly and the at least one isolation valve of the right engine assembly. At least one hydraulic pump is hydraulically connected to the at least one hydraulic fluid reservoir for pressurizing hydraulic fluid in the at least one hydraulic fluid reservoir for selectively applying hydraulic pressure to the at least one hydraulic actuator of the left engine assembly and the at least one hydraulic actuator of the right engine assembly.

According to another aspect of the present technology, there is provided a hydraulic system for actuating a thrust reverser of an aircraft engine assembly. The aircraft engine assembly is connected to an aircraft wing and has a plurality of rotors. The plurality of rotors defines an uncontained rotor impact area. The hydraulic system has at least one hydraulic actuator for actuating the thrust reverser, at least one directional control valve hydraulically connected to the at least one hydraulic actuator for controlling a direction of motion of the at least one hydraulic actuator, the at least one directional control valve being within the uncontained rotor impact area, and at least one isolation valve hydraulically connected to the at least one directional control valve. The at least one isolation valve selectively cuts off a supply of hydraulic fluid to the at least one directional control valve. The at least one isolation valve is disposed rearward of the uncontained rotor impact area and forward of a trailing edge of the aircraft wing.

According to some implementations of the present technology, the at least one isolation valve is disposed under the aircraft wing.

According to some implementations of the present technology, the at least one isolation valve is disposed rearward of the at least one directional control valve.

According to some implementations of the present technology, the at least one isolation valve is disposed rearward of a leading edge of the aircraft wing.

According to some implementations of the present technology, at least one hydraulic fluid reservoir is hydraulically connected with the at least one isolation valve. At least one hydraulic pump is hydraulically connected to the at least one hydraulic fluid reservoir for pressurizing hydraulic fluid in the at least one hydraulic fluid reservoir for selectively applying hydraulic pressure to the at least one hydraulic actuator.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
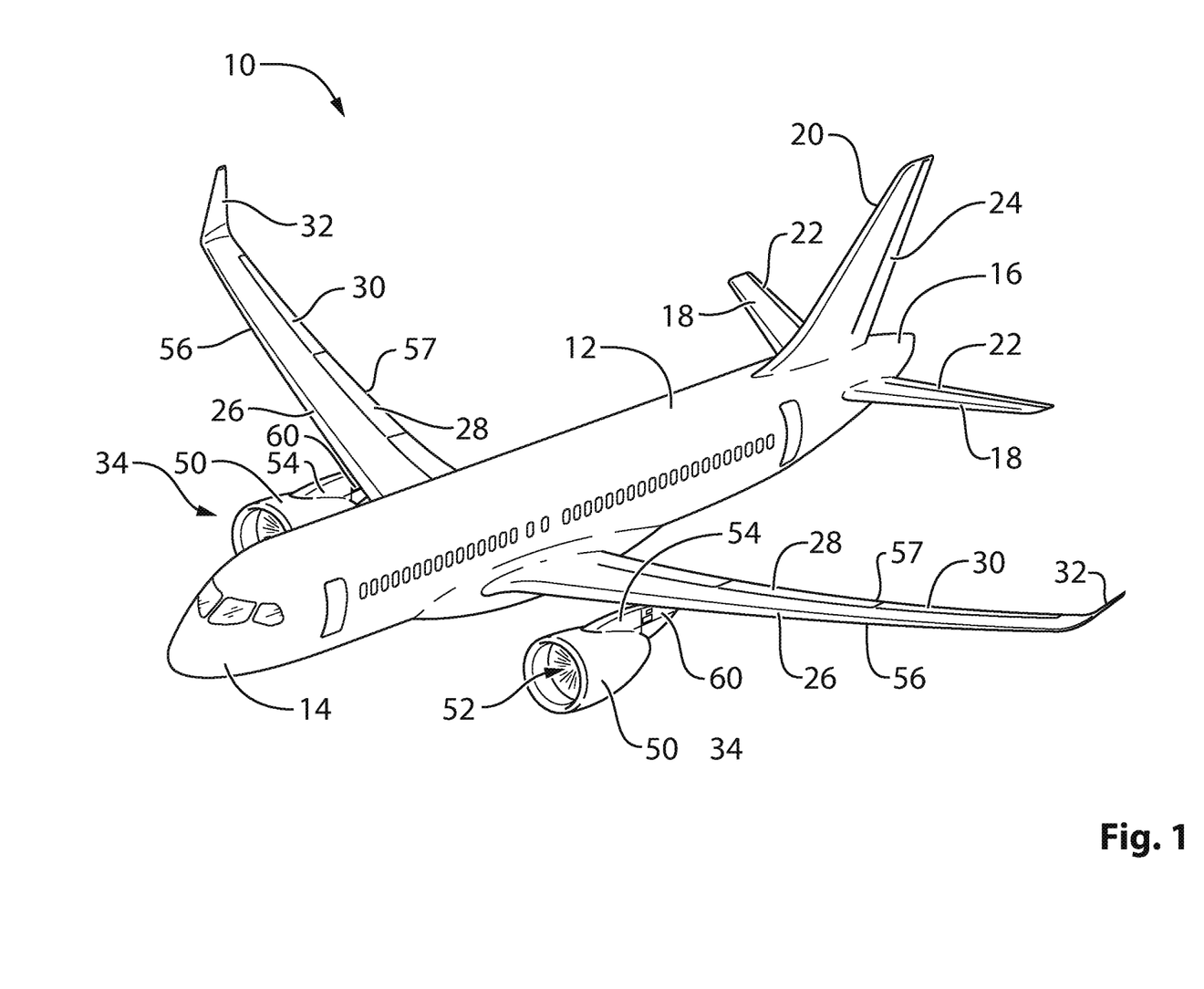
FIG. 1 is a perspective view taken from a top, front, left side of an aircraft.

An aircraft 10 is described below with respect to FIG. 1. The aircraft 10 is an exemplary implementation of an aircraft and other types of aircraft are contemplated. The aircraft 10 has a fuselage 12, a cockpit 14 at a front of the fuselage 12 and a tail 16 at a rear of the fuselage 12. The tail 16 has left and right horizontal stabilizers 18 and a vertical stabilizer 20. Each horizontal stabilizer 18 is provided with an elevator 22 used to control the pitch of the aircraft 10. The vertical stabilizer 20 is provided with a rudder 24 used to control the yaw of the aircraft 10. The aircraft 10 also has a pair of wings 26. The left wing 26 is connected to the fuselage 12 and extends on a left side thereof. The right wing 26 is connected to the fuselage 12 and extends on a right side thereof. The wings 26 are provided with flaps 28 and ailerons 30. The flaps 28 are used to control the lift of the aircraft 10 and the ailerons 30 are used to control the roll of the aircraft 10. Optionally, each wing 26 is provided with a winglet 32 at a tip thereof. Left and right engine assemblies 34 are connected to a bottom of the left and right wings 26 respectively, as will be described in greater detail below. It is contemplated that more than one engine assembly 34 could be connected to each wing 26. The aircraft 10 is provided with many more components and systems, such as a landing gear and auxiliary power unit, which will not be described herein.

Turning now to FIGS. 3 to 6, the left engine assembly 34 will be described in more detail. As the right engine assembly 34 is similar to the left engine assembly 34, it will not be described in detail herein. Elements of the right engine assembly 34 that correspond to those of the left engine assembly 34 have been labeled with the same reference in the figures.

The left engine assembly 34 has a nacelle 50 inside which is an engine 52. In the present implementation, the engine 52 is a turbofan engine such as the Pratt & Whitney™

PW1500G™ turbofan engine. It is contemplated that other turbofan engines could be used. It is also contemplated that an engine other than a turbofan engine could be used.

Figure 6:
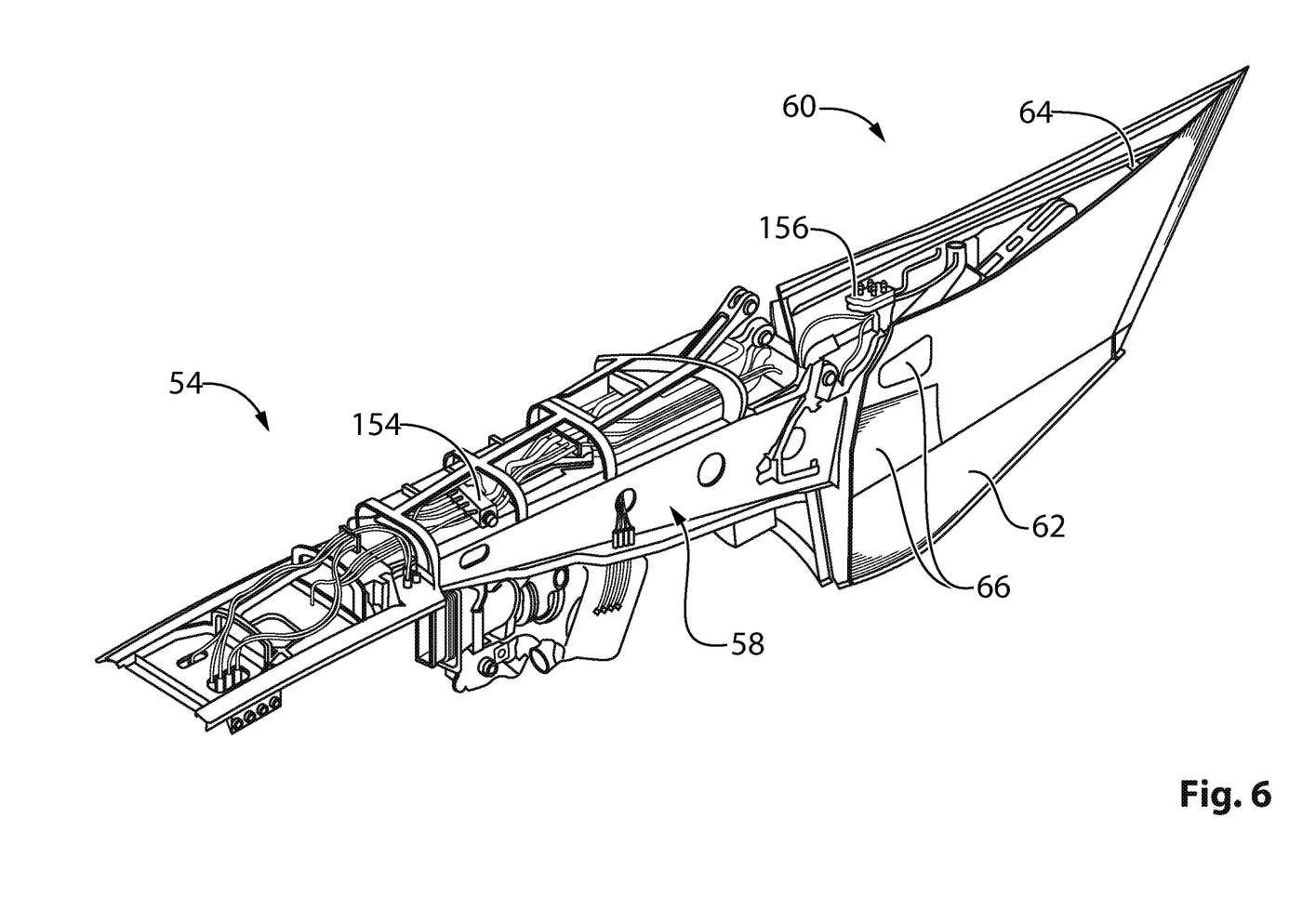
FIG. 6 is a perspective view taken from a top, front, left side of a pylon, an aft fairing and components contained therein of the engine assembly of FIG. 2, with a skin of the pylon removed.

A pylon 54 is connected between the nacelle 50 and a bottom of the left wing 26, thereby connecting the engine 52 to the left wing 26. The pylon 54 extends along a top of the nacelle 50. A majority of the pylon 54 extends forward of a leading edge 56 of the left wing 26. The top, rear portion of the pylon 54 connects to the bottom, front portion of the wing 26. As can be seen in FIG. 6, the pylon 54 has a frame 58 that houses a number of components, some of which will be described below.

An aft faring 60 is connected to the rear of the pylon 54 and the engine 52. A top of the aft fairing 60 is connected to the bottom of the left wing 26 behind the pylon 54. The aft fairing 60 is laterally aligned with the pylon 54. The aft fairing 60 improves the aerodynamic efficiency of the engine assembly 34. The lower portion of the aft fairing 60 includes a heat shield 62 as it is located in alignment with an exhaust of the engine 52. Similar to the pylon 54, the aft fairing 60 has a frame 64 (FIG. 6) that houses a number of components, some of which will be described below. The aft fairing 60 has a number of access panels 66 to provide access to these components.

Figure 2:
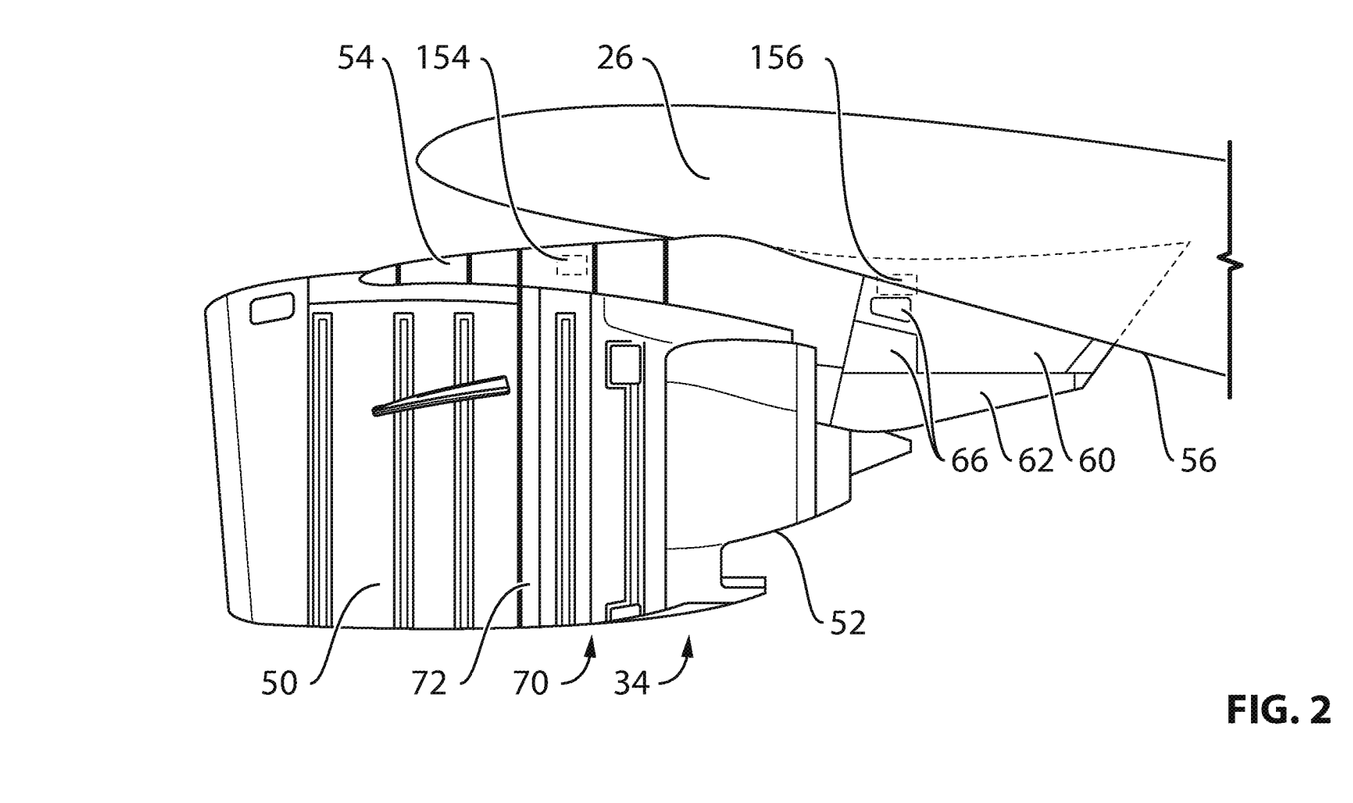
FIG. 2 is a left side elevation of an engine assembly and a portion of left wing of the aircraft of FIG. 1.
Figure 3:
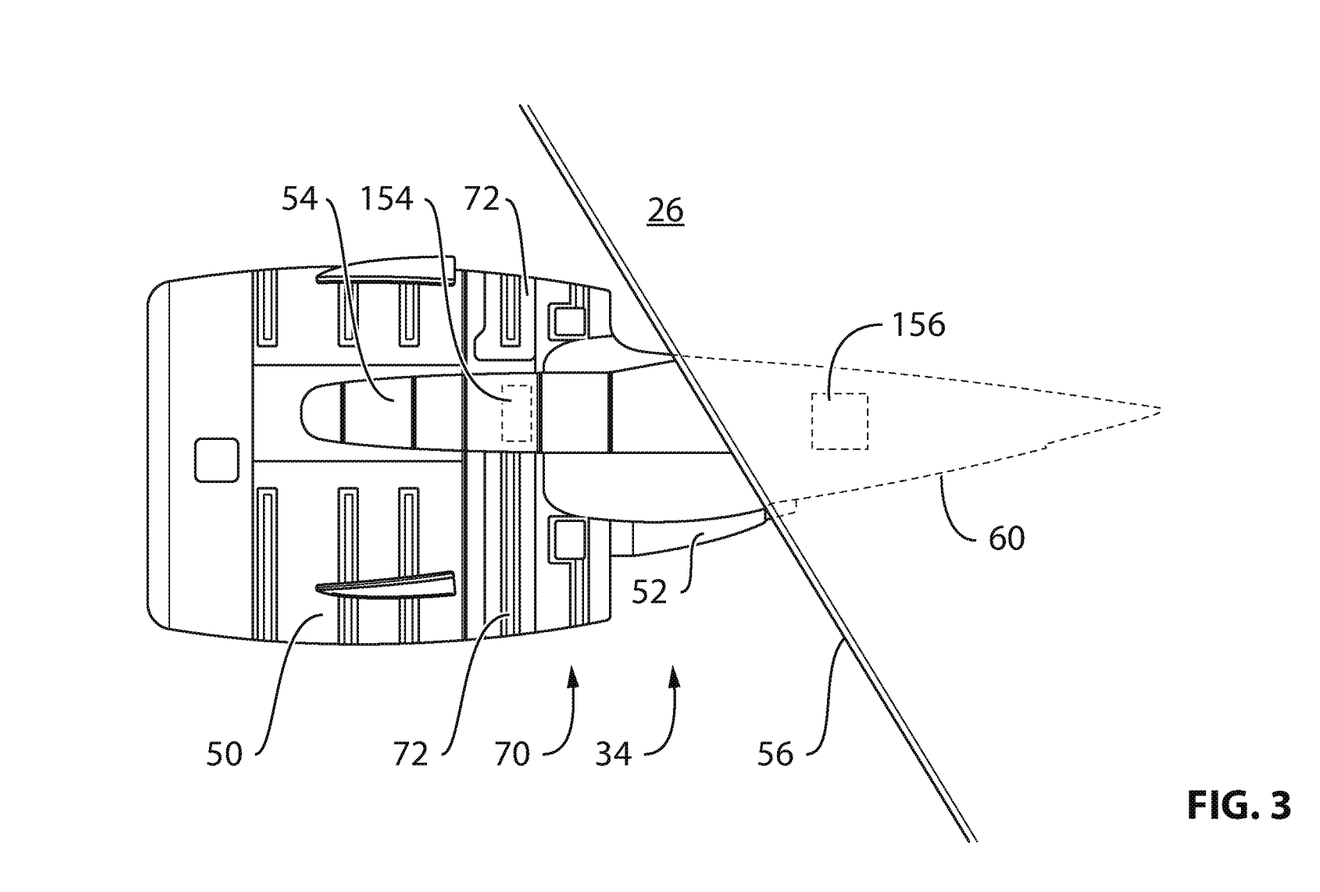
FIG. 3 is a perspective view taken from a top, left side of the left engine assembly and the portion of the left wing of FIG. 2.
Figure 4:
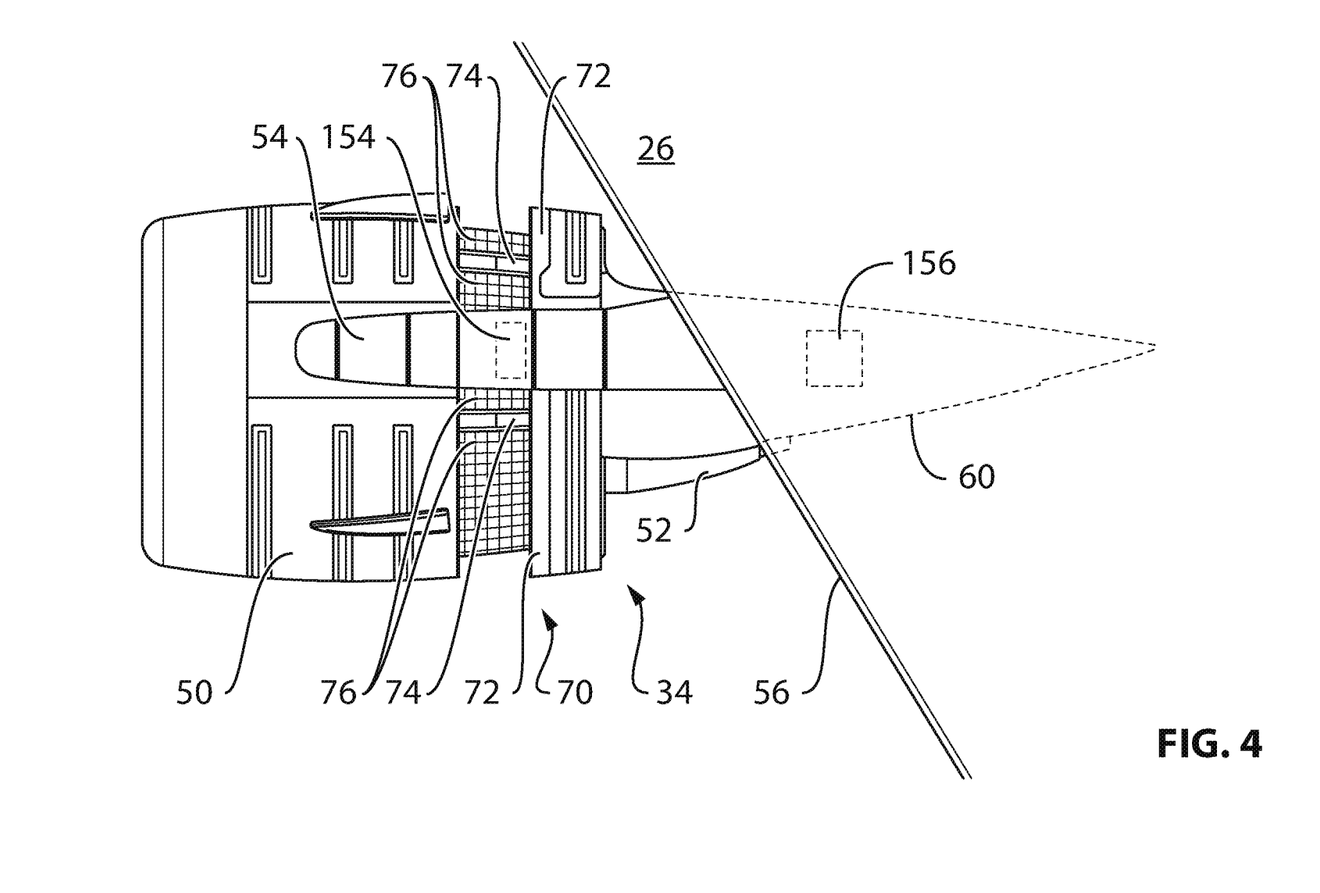
FIG. 4 a perspective view taken from a top, left side of the left engine assembly and the portion of the left wing of FIG. 2 with a thrust reverser system of the left engine assembly in an actuated position.

As can be seen in FIGS. 2 to 4, the engine assembly 34 is also provided with a thrust reverser system 70. The thrust reverser system 70 is used to redirect some of the thrust generated by the engine 52 once the aircraft 10 has touched down during a landing. In the present implementation, the thrust reverser system 70 is a coldstream-type thrust reverser system. When the thrust reverser system 70 is actuated, left and right side panels 72 are displaced rearward over the rear portion of the nacelle 50. Each side panel 72 is actuated by an upper hydraulic thrust reverser actuator 74 and a lower hydraulic thrust reverser actuator 74 (only the upper actuators 74 being shown in FIG. 4). The hydraulic thrust reverser actuators 74 are connected to the nacelle 50, but it is contemplated that they could be connected to the engine 52. As the side panels 72 are displaced rearward, a blocking mechanism (not shown) blocks the passage of air toward the back of the engine 52 and redirects it toward cascade vanes 76. The cascade vanes 76 direct the air toward a front of the aircraft 10, thereby creating a reverse thrust. When the thrust reverser system 70 is not actuated, the side panels 72 are flush with an outer skin of the nacelle 50 as can be seen in FIGS. 2 and 3, and the cascade vanes 76 are covered by the side panels 72. Hydraulic lock actuators 78 (schematically shown in FIG. 10) lock the side panels 72 in their closed positions shown in FIGS. 2 and 3 to prevent the accidental deployment of the thrust reverser system 70 when the aircraft 10 is not on the ground. A hydraulic system used to actuate the thrust reverser system 70 will be described below with respect to FIG. 10. It is contemplated that other types of thrust reverser systems could be used, such as, but not limited to, clamshell-type thrust reverser systems and bucket-type thrust reverser systems.

Figure 5:
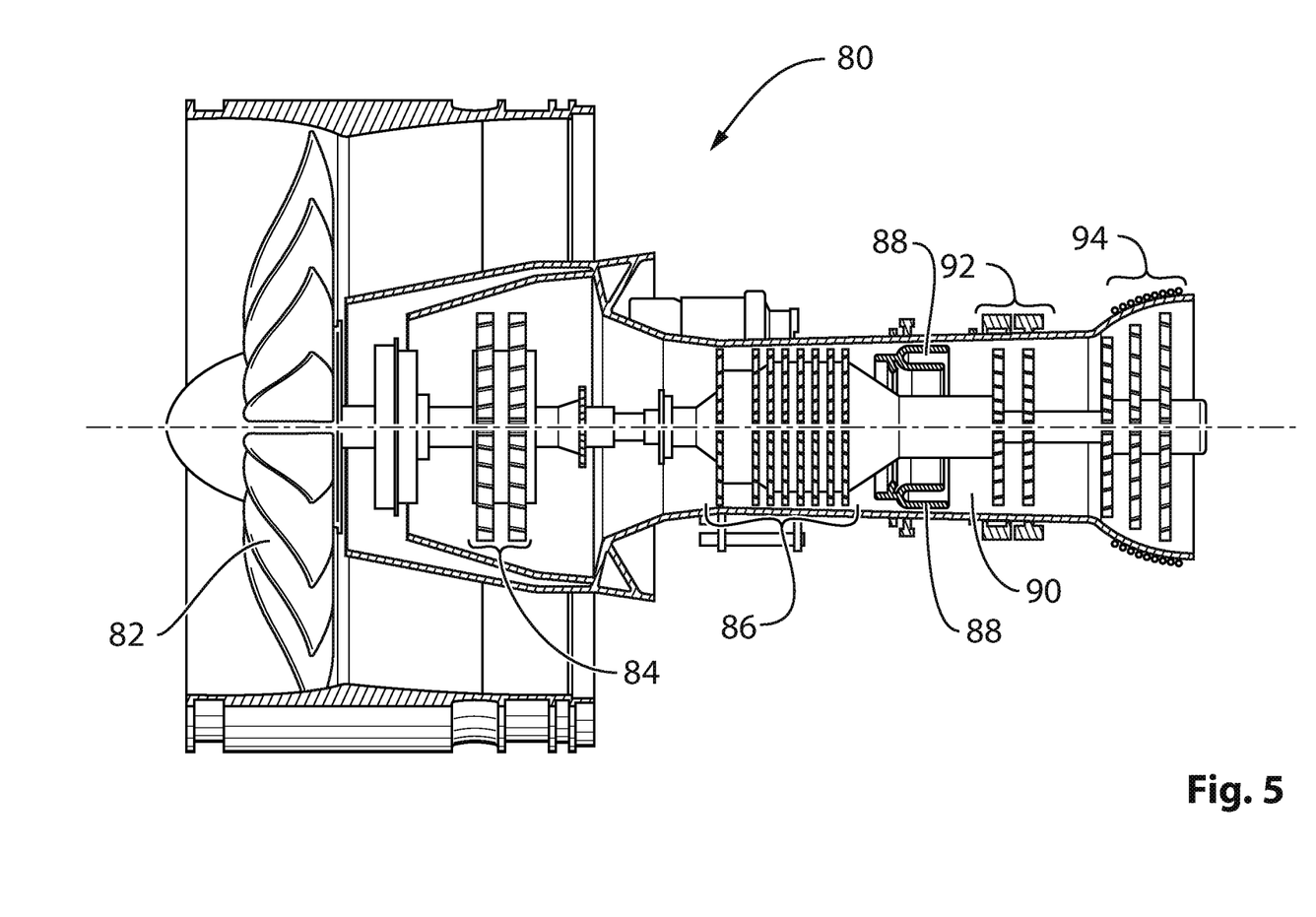
FIG. 5 is a partial cross-section of an engine core of the engine assembly of FIG. 2.

Turning now to FIG. 5, an exemplary implementation of an engine core 80 of the left engine 52 will be described. The engine core 80 has a fan 82, a pair of low pressure compressor rotors 84 rearward of the fan 82 and eight high pressure compressor rotors 86 rearward of the low pressure compressor rotors 84. The engine core 80 also has combustors 88 rearward of the high pressure compressor rotors 86 in a combustion chamber 90. The engine core 80 also has a pair of high pressure turbine rotors 92 rearward of the combustion chamber 90 and three low pressure turbine rotors 94. It is contemplated that the engine core 80 could have more or less of each type of rotor 84, 86, 92 and 94 described above. The engine core 80 has many more components which will not be described herein.

The rotating components of the engine core 80, including the fan 82 and the rotors 84, 86, 92 and 94 are referred to collectively as rotors herein. As previously explained, there is a possibility that one or more rotors could fail such that one or more rotor fragments could break off and escape from the engine 52, which is referred to as an uncontained rotor failure. The area of the aircraft 10 where such a projected rotor fragment could impact, and possibly cause damage, is called the uncontained rotor impact area indicated by the hatched region 100 in FIGS. 7 to 9 for the left engine 52. The Federal Aviation Agency's advisory circular number 20-128A, dated Mar. 25, 1997, the entirety of which is incorporated herein by reference, provides an indication of the engine failure model that should be used to determine the uncontained rotor impact area. However, as indicated in the advisory circular, other models could be used and the engine manufacture can be consulted for guidance.

In the present application, the uncontained rotor impact area refers to the uncontained rotor impact area for all of the rotors of the engine 52. As the uncontained rotor impact areas 100 of the left and right engines 52 are generally mirror images of each other, only the uncontained rotor impact area 100 of the left engine 52 will be described herein.

The rotors of the engine 52 define the uncontained rotor impact area 100. More specifically, the uncontained rotor impact area 100 is defined by the location, size and energy of the rotor fragments that could break off from the engine 52 and the possible spread angle of these rotor fragments. Generally, small rotor fragments have a larger possible spread angle than large rotor fragments.

Large rotor fragments, sometimes referred to as one-third disc fragments, have a "maximum dimension corresponding to one-third of the disc with one third blade height" according to advisory circular number 20-128A. These large rotor fragments have a spread angle of plus/minus 3 degrees. The large rotor fragments define a large fragment uncontained rotor impact area corresponding to the hatched region 102 in FIGS. 7 to 9. As can be seen in FIGS. 8 and 9, the large fragment uncontained rotor impact area of the left engine 52 extends over to the right side of the aircraft 10. However, by taking into account energy considerations, there exists an area 104 on the right side of the aircraft 10 that is vertically between two regions of the large fragment uncontained rotor impact area of the left engine 52 that would be safe from impact from large rotor fragments as the large rotor fragments would be stopped by other components of the aircraft 10 before reaching this area 104. As such, components of the right engine assembly 34 located in the area 104 should be safe from impact with large rotor fragments in the event on an uncontained rotor failure of the left engine 52. Also, components of the right engine assembly 34 located in the area 104 should be safe from impact with smaller rotor fragments in the event on an uncontained rotor failure of the left engine 52 as these tend to have less energy than large rotor fragments and would therefore not reach area 104.

Intermediate rotor fragments have a "maximum dimension corresponding to one-third of the bladed disc radius" according to advisory circular number 20-128A. These intermediate rotor fragments have a spread angle of plus/minus 5 degrees. The intermediate rotor fragments define an intermediate fragment uncontained rotor impact area corresponding to the combination of hatched regions 102 and 106 in FIGS. 7 and 8.

Small rotor fragments, sometimes referred to as shrapnel, have a "maximum dimension corresponding to the tip half of the blade airfoil (with exception of fan blades)" according to advisory circular number 20-128A. These small rotor fragments have a spread angle of plus/minus 15 degrees. The small rotor fragments define a small fragment uncontained rotor impact area corresponding to the combination of hatched regions 102, 106 and 108 in FIGS. 7 and 8.

Figure 7:
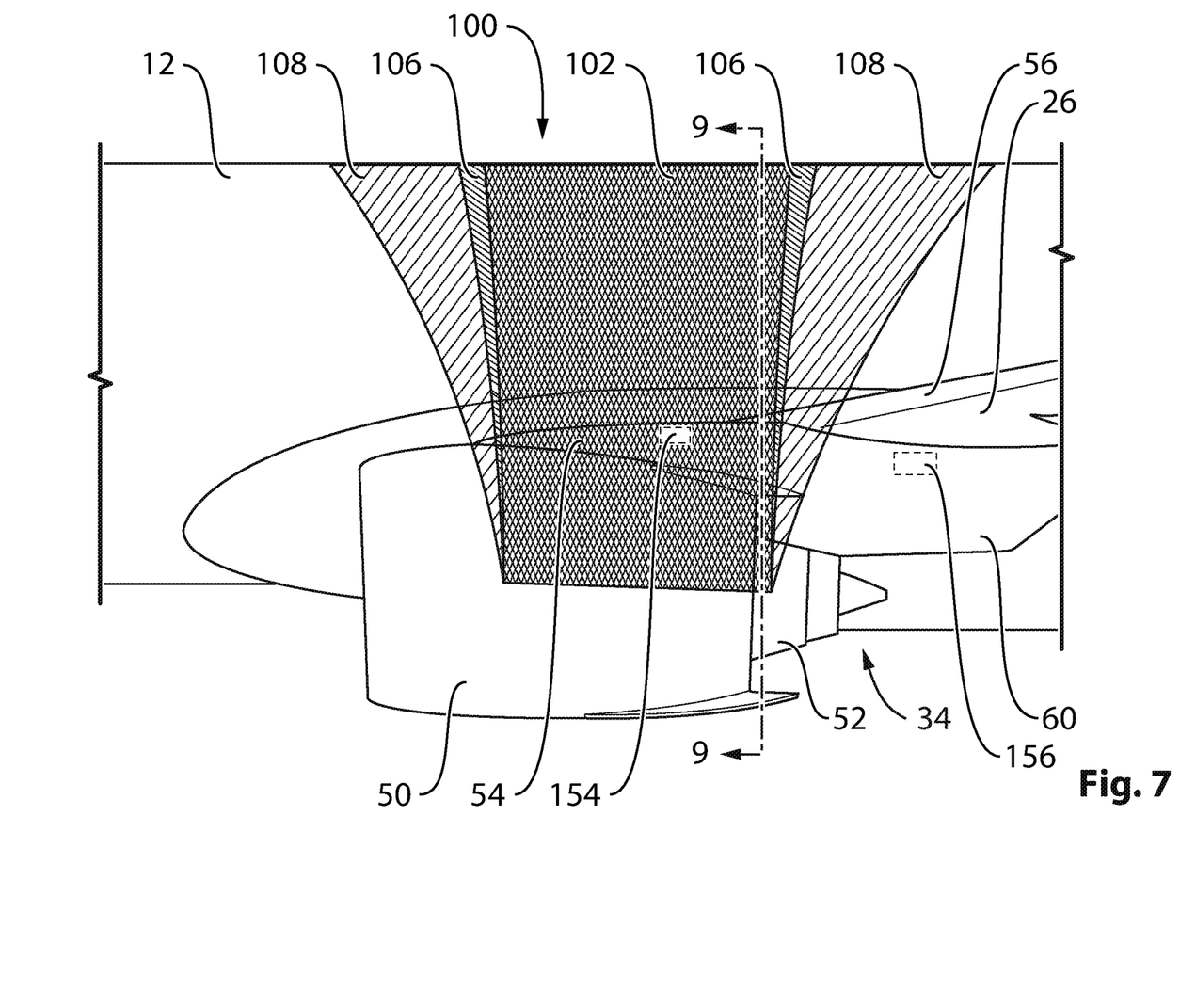
FIG. 7 is a close-up left side elevation view of a portion of the aircraft of FIG. 1 having the left engine assembly showing an uncontained rotor impact area of a left engine of the left engine assembly.
Figure 8:
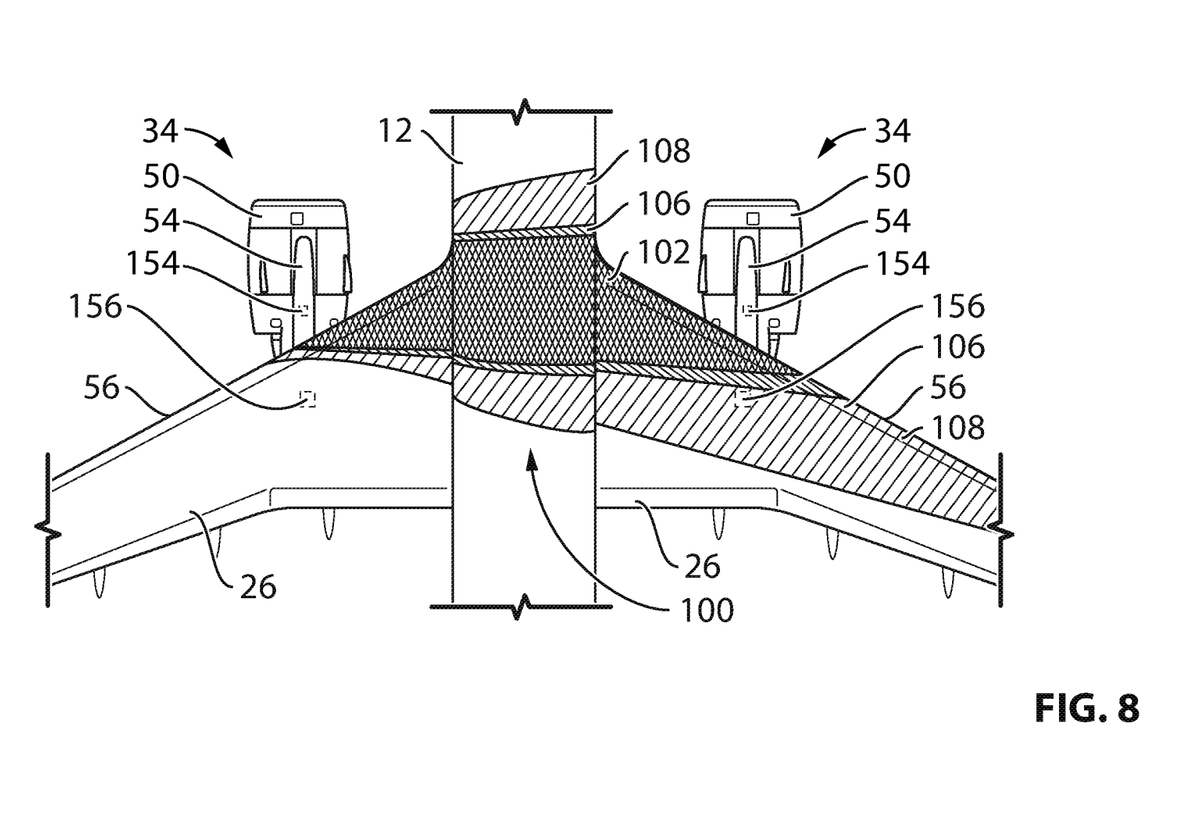
FIG. 8 is a close-up top plan view of a portion of the aircraft of FIG. 1 having the engine assemblies showing an uncontained rotor impact area of the left engine.
Figure 9:
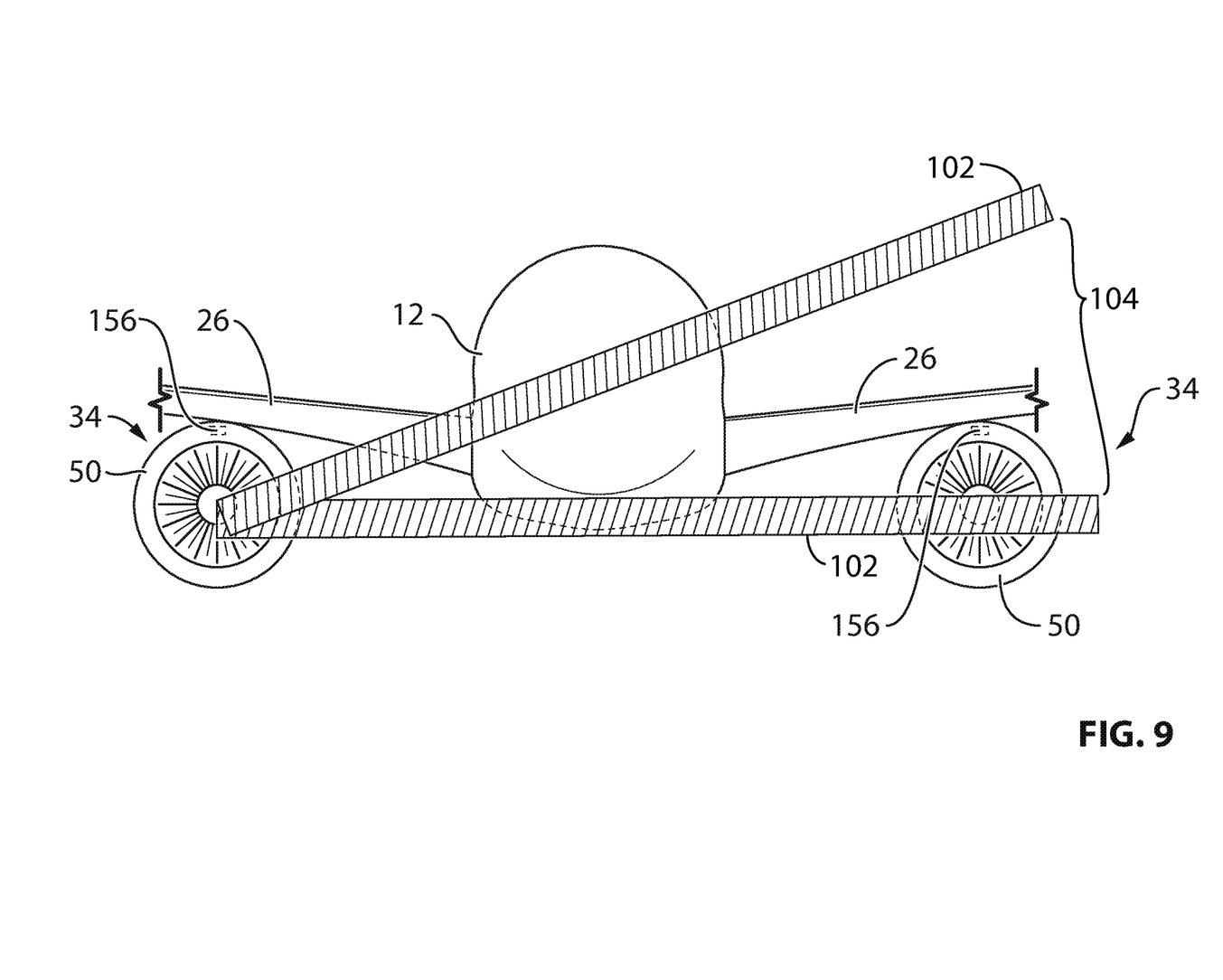
FIG. 9 is a schematic cross-sectional view of the aircraft of FIG. 1 taken through line 9-9 of FIG. 7 showing a large fragment uncontained rotor impact area of the left engine.

The uncontained rotor impact area 100 of the rotors of the left engine 52 therefore corresponds to the combination of the small, medium and large uncontained rotor impact areas of the rotors of the left engine 52 and corresponds to the hatched regions 102, 106 and 108 in FIGS. 7 to 9.

Figure 10:
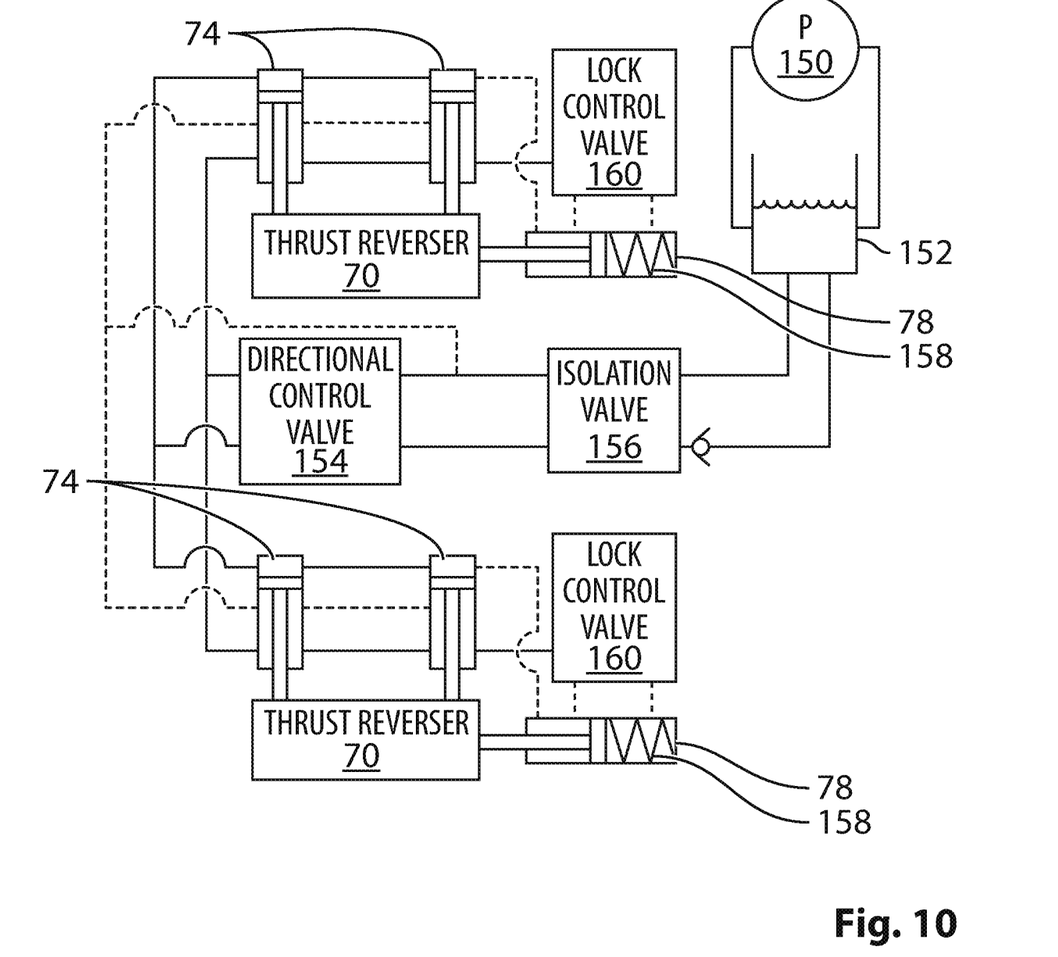
FIG. 10 is a schematic illustration of a portion of a hydraulic system of the aircraft of FIG. 1 corresponding to the thrust reverser of the left engine assembly.

Turning now to FIG. 10, the hydraulic system used to actuate the thrust reverser system 70 of the left engine assembly 34 will be described. The right engine assembly 34 has a corresponding hydraulic system and as such it will not be described herein. The hydraulic system illustrated in FIG. 10 has four hydraulic thrust reverser actuators 74 (i.e. two per side) and two hydraulic lock actuators 78 (i.e. one per side). It is contemplated that the hydraulic system could have more or less hydraulic thrust reverser actuators 74 and hydraulic lock actuators 78 than illustrated.

A hydraulic pump 150 is hydraulically connected to a hydraulic fluid reservoir 152 to pressurize hydraulic fluid stored in the hydraulic fluid reservoir 152. In the present implementation, the hydraulic pump 150 is mounted to the engine assembly 34 and is driven by the engine 52. In some implementations, two hydraulic pumps 150 are mounted to the engine assembly 34 and hydraulically connected to the hydraulic fluid reservoir 152. It is also contemplated that one or more backup pump, such as electric pumps, could be provided. It is also contemplated that the pump 150 could be an electric pump. The hydraulic fluid reservoir 152 is provided remotely from the engine assembly 34. It is contemplated that the hydraulic fluid reservoir 152 could be provided in or under the fuselage 12. In the present implementation, the hydraulic fluid reservoir 152 provides hydraulic fluid to many hydraulic systems of the aircraft 10 in addition to the hydraulic system of the left thrust reverser system 70, but it is contemplated that the hydraulic fluid reservoir 150 could be dedicated to the hydraulic system of the left thrust reverser system 70. In some implementations, the same hydraulic fluid reservoir 152 is used for the hydraulic systems of the left and right thrust reverser systems 70.

The hydraulic fluid reservoir 152 is hydraulically connected to an isolation valve 156. Although only one isolation valve 156 is shown, it is contemplated that more than one isolation valve 156 could be provided. The isolation valve 156 is hydraulically connected to a directional control valve 154 that is separate from the isolation valve 156. Although only one directional control valve 154 is shown, it is contemplated that more than one directional control valve 154 could be provided. By separating the isolation valve 156 from the directional control valve 154, the directional control valve 154 is located in proximity to the hydraulic thrust reverser actuators 74. Also, separating the isolation valve 156 and the directional control valve 154 facilitates the positioning of these two valves 156, 154 within the aircraft 10 compared to prior art arrangements having a large valve unit combining the isolation and control functions.

Components of the hydraulic system disposed on the same side of the isolation valve 156 in the hydraulic circuit as the hydraulic fluid reservoir 152 are referred to herein as being disposed upstream of the isolation valve 156. Components of the hydraulic system disposed on the same side of the isolation valve 156 in the hydraulic circuit as the directional control valve 154 are referred to herein as being disposed downstream of the isolation valve 156. The isolation valve 156 is in a closed position by default. As such, the isolation valve 156 is closed when the thrust reverser system 70 is not to be actuated. As such, when the thrust reverser system 70 is not to be actuated, the isolation valve 156 cuts off a supply of hydraulic fluid to the directional control valve 154, and therefore the rest of the hydraulic system for the thrust reverser system 70. As a result, should a hydraulic line downstream of the isolation valve 156 become damaged, only the limited amount of hydraulic fluid in the portion that is downstream of the isolation valve 156 can drain out of the hydraulic system for the thrust reverser system 70 and not the entire amount of hydraulic fluid contained in the hydraulic fluid reservoir 152. A controller (not shown) sends a signal to a valve actuator (not shown), such as a solenoid, to move the isolation valve 156 to an opened position upon receiving a signal that the thrust reverser system 70 is to be actuated. It is contemplated that the controller could also require additional conditions before sending the signal to open the isolation valve 156. One example of such an additional condition could be that the wheels of the aircraft 10 have touched the ground.

The directional control valve 154 is hydraulically connected to one hydraulic thrust reverser actuator 74 on each side of the engine 52. As can be seen, each one of these two actuators 74 is hydraulically connected in series to a second hydraulic thrust reverser actuator 74 on its corresponding side of the engine 52. As such, in the implementation shown, the two hydraulic thrust reverser actuators 74 on each side of the engine 52 are positioned in series. The directional control valve 154, as the name suggests, controls the direction in which hydraulic pressure is supplied to the hydraulic thrust reverser actuators 74 so as to control a direction of motion of the hydraulic thrust reverser actuators 74. When the thrust reverser system 70 is not to be actuated or is to be closed, the directional control valve 154 controls the direction in which hydraulic pressure is supplied such that the hydraulic thrust reverser actuators 74 remain at, or are moved toward, a position corresponding to a non-actuated (or closed) position of the thrust reverser system 70. The controller (not shown) sends a signal to a valve actuator (not shown), such as a solenoid, to move the directional control valve 154 to move to a position reversing the direction of supply of hydraulic pressure to the actuators 74 upon receiving a signal that the thrust reverser system 70 is to be actuated. As a result, the actuators 74 are moved so as to actuate the thrust reverser system 70. It is contemplated that the controller could also require additional conditions before sending the signal to move the directional control valve 154 to this position, such as the example provided above with respect to the isolation valve 156.

As mentioned above, the hydraulic system for the thrust reverser system 70 also has hydraulic lock actuators 78 used to lock their corresponding portions of the thrust reverser system 70 in order to prevent accidental deployment of the thrust reverser system 70. Springs 158 bias the lock actuators 78 toward a locked position such that when the isolation valve 156 is closed the lock actuators 78 lock the thrust reverser system 70. In FIG. 10, the hydraulic connections associated with the lock actuators 78 are shown in dotted lines. Each lock actuator 78 is hydraulically connected to one of its associated hydraulic thrust reverser actuators 74 and to a hydraulic lock control valve 160 as shown. Each lock control valve 160 is hydraulically connected to one of its associated hydraulic thrust reverser actuators 74. The controller (not shown) sends signals to valve actuators (not shown), such as solenoids, to move the lock control valves based on the positions of their corresponding directional control valves 154 such that when the isolation valve is opened pressure is supplied to the lock actuators 78 such that they are moved and/or remain in an unlocked position regardless of the positions of the directional control valves 154. As such, when the isolation valve 156 is closed, the lock actuators 78 lock the thrust reverser system 70, thereby preventing its actuation and when the isolation valve 156 is opened, the lock actuators 78 unlock the thrust reverser system 70, thereby permitting its actuation.

Turning back to FIGS. 2 to 4 and 6, it can be seen for the left engine assembly 34 that the directional control valve 154 is disposed inside the pylon 54, forward of the leading edge 56 of the left wing 26. As can be seen in FIG. 7, in this position, the directional control valve 154 is disposed in the uncontained rotor impact area 100, and more specifically inside the large fragment uncontained rotor impact area (i.e. shaded region 102). It is contemplated that the directional control valve 154 could be located in the pylon 54 at a position other than the one illustrated. It is also contemplated that the directional control valve 154 could be located in the nacelle 50 or at some other location in the left engine assembly 34. The directional control valve 154 of the right engine assembly 34 is located in a corresponding position in the right pylon 54.

As can be seen in FIGS. 2 to 4 and 6 for the left engine assembly 34, the isolation valve 156 is disposed inside the aft fairing 60. More specifically, the left isolation valve 156 is disposed inside the left aft fairing 60 in an upper, front portion thereof. As such, the isolation valve 156 is disposed under the left wing 26, rearward of the leading edge 56 of the left wing 26 and forward of a trailing edge 57 (FIG. 1) of the left wing 26. As can be seen, the left isolation valve 156 is disposed rearward of the left pylon 54, and therefore rearward of the left directional control valve 154, and is laterally aligned with the left pylon 54.

As can be seen in FIGS. 7 to 9, in this position, the isolation valve 156 is disposed outside of, and rearward of the uncontained rotor impact area 100 (i.e. small, intermediate and large fragment uncontained rotor impact areas) of the rotors of the left engine 52. As such, in the event of an uncontained rotor failure of the left engine 52, the left engine isolation valve 156 and its upstream hydraulic piping would not be impacted by a fragment of rotor projected by the left engine 52. As would be understood from the above description of the uncontained rotor impact area with respect to FIG. 9, and as can be seen for the right directional control valve 154, the left directional control valve 154 is positioned in an area on a left side of the aircraft 10 corresponding to the area 104 on the right side of the aircraft 10 shown in FIG. 9. This area is vertically between two regions of the large fragment uncontained rotor impact area of the right engine 52. Therefore, the left isolation valve 156 is outside of the large fragment uncontained rotor impact area, and the overall uncontained rotor impact area 100, of the rotors of the right engine 52. As such, in the event of an uncontained rotor failure of the right engine 52, the left isolation valve 156 and its upstream hydraulic piping would not be impacted by a fragment of rotor projected by the right engine 52. As a result, should either engines 52 suffer an uncontained rotor failure, the left isolation valve 156 would not be damaged due to an impact with a rotor fragment and would thus prevent hydraulic fluid upstream of the left isolation valve 156 from spilling on the left engine 52. It is contemplated that the left isolation valve 156 could be disposed in other locations rearward of the uncontained rotor impact area 100 and forward of the trailing 57 of the left wing 26, such as in the left wing 26 for example.

As can be seen in FIGS. 8 and 9, the right isolation valve 156 of the right engine assembly 34 is located in a corresponding position in the right aft fairing 60. Therefore, the right isolation valve 156 is disposed under the right wing 26, rearward of the leading edge 56 of the right wing 26, forward of a trailing edge 57 (FIG. 1) of the right wing 26, rearward of the right pylon 54, rearward of the right directional control valve 154, and is laterally aligned with the right pylon 54. In this position, the isolation valve 156 is disposed rearward of the uncontained rotor impact area 100 (i.e. small, intermediate and large fragment uncontained rotor impact areas) of the rotors of the right engine 52 and outside of the large fragment uncontained rotor impact area, and the overall uncontained rotor impact area 100, of the rotors of the left engine 52. As such, in the event of an uncontained rotor failure of the right engine 52, the right engine isolation valve 156 would not be impacted by a fragment of rotor projected by the right engine 52. Also, in the event of an uncontained rotor failure of the left engine 52, the right isolation valve 156 would not be impacted by a fragment of rotor projected by the left engine 52. Should either engine 52 suffer an uncontained rotor failure, the right isolation valve 156 would not be damaged due to an impact with a rotor fragment and would thus prevent hydraulic fluid upstream of the right isolation valve 156 from spilling on the right engine 52. It is contemplate that the right isolation valve 156 could be disposed in other locations rearward of the uncontained rotor impact area 100 and forward of the trailing 57 of the right wing 26, such as in the right wing 26 for example.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. An aircraft comprising:
    a fuselage;
    a left wing connected to the fuselage and extending on a left side of the fuselage;
    a right wing connected to the fuselage and extending on a right side of the fuselage;
    a left engine assembly connected to the left wing; and
    a right engine assembly connected to the right wing,
    each of the left and right engine assemblies comprising:
        a nacelle;
        an engine housed in the nacelle, the engine having a plurality of rotors, the plurality of rotors defining an uncontained rotor impact area;
        a pylon connecting the nacelle to a corresponding one of the left wing and the right wing;
        at least one hydraulic actuator connected to at least one of the engine and the nacelle;
        at least one directional control valve hydraulically connected to the at least one hydraulic actuator for controlling a direction of motion of the at least one hydraulic actuator;
        an aft fairing connected to a rear of the pylon and to a bottom of the corresponding one of the left wing and the right wing; and
        at least one isolation valve hydraulically connected to the at least one directional control valve, the at least one isolation valve selectively cutting off a supply of hydraulic fluid to the at least one directional control valve, the at least one isolation valve being disposed under the corresponding one of the left wing and the right wing, rearward of the pylon, inside the aft fairing, rearward of the uncontained rotor impact area and forward of a trailing edge of the corresponding one of the left wing and the right wing.

2. The aircraft of claim 1, wherein for each of the left and right engine assemblies the at least one directional control valve is disposed inside the pylon.

3. The aircraft of claim 1, wherein for each of the left and right engine assemblies the at least one isolation valve is laterally aligned with the pylon.

4. The aircraft of claim 1, wherein for each of the left and right engine assemblies the at least one isolation valve is disposed rearward of the at least one directional control valve.

5. The aircraft of claim 1, wherein for each of the left and right engine assemblies the at least one isolation valve is disposed rearward of a leading edge of the corresponding one of the left wing and the right wing.

6. The aircraft of claim 1, wherein for each of the left and right engine assemblies the at least one directional control valve is disposed in the uncontained rotor impact area.

7. The aircraft of claim 1, wherein:
for each of the left and right engine assemblies:
the uncontained rotor impact area includes:
a large fragment uncontained rotor impact area; and
a small fragment uncontained rotor impact area, the large fragment uncontained rotor impact area being smaller than the small fragment uncontained rotor impact area;
the at least one isolation valve of the left engine assembly is disposed:
rearward of the small fragment uncontained rotor impact area of the plurality of rotors of left engine assembly; and
outside of the large fragment uncontained rotor impact area of the plurality of rotors of the right engine assembly; and
the at least one isolation valve of the right engine assembly is disposed:
rearward of the small fragment uncontained rotor impact area of the plurality of rotors of right engine assembly; and
outside of the large fragment uncontained rotor impact area of the plurality of rotors of the left engine assembly.

8. The aircraft of claim 1, wherein each of the left and right engine assemblies further comprises a thrust reverser system operatively connected to the engine; and
wherein for each of the left and right engine assemblies the at least one hydraulic actuator includes at least one hydraulic thrust reverser actuator for actuating the thrust reverser system.

9. The aircraft of claim 1, further comprising:
at least one hydraulic fluid reservoir hydraulically connected with the at least one isolation valve of the left engine assembly and the at least one isolation valve of the right engine assembly; and
at least one hydraulic pump hydraulically connected to the at least one hydraulic fluid reservoir for pressurizing hydraulic fluid in the at least one hydraulic fluid reservoir for selectively applying hydraulic pressure to the at least one hydraulic actuator of the left engine assembly and the at least one hydraulic actuator of the right engine assembly.

10. An aircraft comprising:
a fuselage;
a left wing connected to the fuselage and extending on a left side of the fuselage;
a right wing connected to the fuselage and extending on a right side of the fuselage;
a left engine assembly connected to the left wing; and
a right engine assembly connected to the right wing,
each of the left and right engine assemblies comprising:
a nacelle;
an engine housed in the nacelle, the engine having a plurality of rotors, the plurality of rotors defining an uncontained rotor impact area;
a pylon connecting the nacelle to a corresponding one of the left wing and the right wing;
an aft fairing connected to a rear of the pylon and to a bottom of the corresponding one of the left wing and the right wing;
at least one hydraulic actuator connected to at least one of the engine and the nacelle;
at least one directional control valve hydraulically connected to the at least one hydraulic actuator for controlling a direction of motion of the at least one hydraulic actuator; and
at least one isolation valve hydraulically connected to the at least one directional control valve, the at least one isolation valve selectively cutting off a supply of hydraulic fluid to the at least one directional control valve, the at least one isolation valve being disposed under the corresponding one of the left wing and the right wing, rearward of the pylon, and inside the aft fairing.

11. The aircraft of claim 10, wherein for each of the left and right engine assemblies the at least one directional control valve is disposed inside the pylon.

12. The aircraft of claim 10, wherein for each of the left and right engine assemblies the at least one isolation valve is disposed rearward of the at least one directional control valve.

13. The aircraft of claim 10, wherein each of the left and right engine assemblies further comprises a thrust reverser system operatively connected to the engine; and
wherein for each of the left and right engine assemblies the at least one hydraulic actuator includes at least one hydraulic thrust reverser actuator for actuating the thrust reverser system.

14. The aircraft of claim 10, further comprising:
at least one hydraulic fluid reservoir hydraulically connected with the at least one isolation valve of the left engine assembly and the at least one isolation valve of the right engine assembly; and
at least one hydraulic pump hydraulically connected to the at least one hydraulic fluid reservoir for pressurizing hydraulic fluid in the at least one hydraulic fluid reservoir for selectively applying hydraulic pressure to the at least one hydraulic actuator of the left engine assembly and the at least one hydraulic actuator of the right engine assembly.

15. An aircraft comprising:
a fuselage;
a left wing connected to the fuselage and extending on a left side of the fuselage;
a right wing connected to the fuselage and extending on a right side of the fuselage;
a left engine assembly connected to the left wing; and
a right engine assembly connected to the right wing, each of the left and right engine assemblies comprising:
  a nacelle;
  an engine housed in the nacelle, the engine having a plurality of rotors, the plurality of rotors defining an uncontained rotor impact area;
  a pylon connecting the nacelle to a corresponding one of the left wing and the right wing;
  at least one hydraulic actuator connected to at least one of the engine and the nacelle;
  at least one directional control valve hydraulically connected to the at least one hydraulic actuator for controlling a direction of motion of the at least one hydraulic actuator;
  an aft fairing connected to a rear of the pylon and to a bottom of the corresponding one of the left wing and the right wing; and
  at least one isolation valve hydraulically connected to the at least one directional control valve, the at least one isolation valve selectively cutting off a supply of hydraulic fluid to the at least one directional control valve, the at least one isolation valve being disposed under the corresponding one of the left wing and the right wing, rearward of the pylon, inside the aft fairing, rearward of a leading edge of the corresponding one of the left wing and the right wing and forward of a trailing edge of the corresponding one of the left wing and the right wing.

16. The aircraft of claim 15, wherein for each of the left and right engine assemblies the at least one directional control valve is disposed inside the pylon.

17. The aircraft of claim 15, wherein for each of the left and right engine assemblies the at least one isolation valve is laterally aligned with the pylon.

18. The aircraft of claim 15, wherein each of the left and right engine assemblies further comprises a thrust reverser system operatively connected to the engine; and
  wherein for each of the left and right engine assemblies the at least one hydraulic actuator includes at least one hydraulic thrust reverser actuator for actuating the thrust reverser system.

19. The aircraft of claim 15, further comprising:
  at least one hydraulic fluid reservoir hydraulically connected with the at least one isolation valve of the left engine assembly and the at least one isolation valve of the right engine assembly; and
  at least one hydraulic pump hydraulically connected to the at least one hydraulic fluid reservoir for pressurizing hydraulic fluid in the at least one hydraulic fluid reservoir for selectively applying hydraulic pressure to the at least one hydraulic actuator of the left engine assembly and the at least one hydraulic actuator of the right engine assembly.

20. A hydraulic system for actuating a thrust reverser of an aircraft engine assembly, the aircraft engine assembly being connected to an aircraft wing and comprising a plurality of rotors, the plurality of rotors defining an uncontained rotor impact area, the hydraulic system comprising:
  at least one hydraulic actuator for actuating the thrust reverser;
  at least one directional control valve hydraulically connected to the at least one hydraulic actuator for controlling a direction of motion of the at least one hydraulic actuator, the at least one directional control valve being within the uncontained rotor impact area; and
  at least one isolation valve hydraulically connected to the at least one directional control valve, the at least one isolation valve selectively cutting off a supply of hydraulic fluid to the at least one directional control valve, the at least one isolation valve being disposed under the aircraft wing, rearward of a pylon, inside an aft fairing connected to a rear of the pylon and to a bottom of the aircraft wing, rearward of the uncontained rotor impact area and forward of a trailing edge of the aircraft wing.

21. The hydraulic system of claim 20, wherein the at least one isolation valve is disposed rearward of the at least one directional control valve.

22. The hydraulic system of claim 20, wherein the at least one isolation valve is disposed rearward of a leading edge of the aircraft wing.

23. The hydraulic system of claim 20, further comprising:
  at least one hydraulic fluid reservoir hydraulically connected with the at least one isolation valve; and
  at least one hydraulic pump hydraulically connected to the at least one hydraulic fluid reservoir for pressurizing hydraulic fluid in the at least one hydraulic fluid reservoir for selectively applying hydraulic pressure to the at least one hydraulic actuator.

\* \* \* \* \*